United States Patent Office 2,893,897
Patented July 7, 1959

2,893,897
METHOD OF COATING

Augusto Uccelli, Como, Italy

No Drawing. Application February 14, 1956
Serial No. 565,318

Claims priority, application Switzerland
February 17, 1955

1 Claim. (Cl. 117—137)

The present invention relates to a method of producing a resistant protective covering or rendering, in particular for walls, facades and staircases. Said rendering is produced on the basis of quartz sand and, owing to the properties of the latter material, has a relatively high degree of hardness. Various renderings containing quartz sand are already known. The properties of said known renderings, however, can be substantially improved by the present invention.

The method of producing a rendering according to the invention is that dry quartz sand and a powdery bonding agent made from calcium carbonate and at least one barium compound are blended to form a dry, powdery mix, that a liquid mix is prepared separately from water and water glass and that the powdery mix is not stirred with the liquid mix to form a paste until immediately before the rendering is used, the said paste being applied as a rendering and then allowed to set and dry.

The powdery bonding agent can be suitably produced by the dry mixing of barium sulphate, barium oxide and calcium carbonate, it also being advantageous to add a little titanium oxide. Ground marble can be used as calcium carbonate.

Pulverized asbestos fibers can also be advantageously added to the powdery mix.

The liquid mix is suitably made from sodium silicate, potassium silicate and water, it being advantageous to add a little glycerine thereto.

The rendering material can be given any desired color by adding metallic-oxide or chrome pigments to the powdery mix.

According to the quantity of powdery bonding agent and to the liquid mix that is used, the surface of the rendering will be coarser or finer to the point of glassiness.

A few typical embodiments of the method according to the invention will now be explained.

First of all, a powdery bonding agent is produced by mixing together in the dry state, i.e. in a mixing drum, 50 parts by weight of barium sulphate ($BaSO_4$), 25 parts by weight of barium oxide (BaO), 25 parts by weight of calcium carbonate ($CaCO_3$) in the form of white marble powder and 3 parts by weight of titanium oxide. All these constituents are, of course, in a powdery, dry state before mixing, or else, if necessary, they are ground to as fine a powder as possible before being poured into the mixing drum.

The mix thus comprises white, pigmenting earths. An intimately mixed, homogeneous composition is thereby obtained which, in the proportions indicated, yields an end product of remarkable plasticity and has the property of revealing no precipitation while it is being applied.

The barium sulphate has a great water-absorbing capacity, whereby the volume of the composition increases accordingly; this, once again, gives the end product unusual plasticity and prevents precipitation.

The calcium carbonate, in view of its advantageous price and of the fact that it does not impair the compound, is added as a cost-reducing factor.

The barium oxide (or barium sulphide) has the property of giving the coat consistency and hardness after it has been applied.

The titanium oxide increases both the covering capacity and the whiteness of the color mix.

28 kilograms, for instance, of the powdery bonding agent thus obtained are taken and mixed with about 70 kilograms of pure, dried quartz sand. The quartz sand may, as desired, have a granulation of e.g. 0.05 to 0.2 mm. grain diameter. The best results are achieved when using quartz which has been extracted from mines in the form of sand. Ground quartz stone is as a rule unsuitable. In practice perfect results have been obtained with a quartz sand having the following composition: 99.75 to 99.85 percent silicon dioxide ($SiO_2$), 0.10 to 0.15 percent calcium oxide (CaO), 0.09 to 0.12 percent aluminum oxide ($Al_2O_3$), 0.011 to 0.015 percent selenium oxide ($Se_2O_3$) and traces of other compounds. The bonding agent is mixed with the quartz sand in a mixing drum to which 4 kilograms of pulverized, dry asbestos fibres are also added. The quartz sand is colorless and acts as a neutral, i.e. nonreactive filling material in respect of the other constituents of the mix; it causes the mix to have not only unusual covering capacity but also great hardness which is to be attributed to the special properties of the silicon dioxide; the asbestos fibers give the product its insulating and non-inflammable properties.

The powdery mix thus obtained is practically white in color. If it is desired to give the rendering a color other than white, a powdery pigment is carefully added to the mix. It is advantageous to mix the pigment with some of the quartz sand before the latter is blended with the other constituents. Oxide or chrome pigments are used for this coloring.

If the proportions of the abovementioned mix are altered, e.g. are in the ratio:

| | Kg. |
|---|---|
| Mix of pigmenting earths | 68 |
| Quartz sand | 25 |
| Asbestos fibers | 7 | this will also cause a change in the properties of the end product. By increasing the proportion of pigmenting earths, far better plasticity is achieved, which is more indicated in various fields of application, although the other properties of the abovementioned mix are retained despite the alteration of the proportions.

The finished, powdery mix is finally sieved and poured into bags, as is the case with, for instance, cement.

A liquid mix is prepared separately from the powdery mix described above. By way of example, 35 kilograms of water, 35 kilograms of sodium silicate ($Na_4SiO_4$) or ($Na_2SiO_3$) and 35 kilograms of potassium silicate ($K_4SiO_4$) or ($K_2SiO_3$) are thoroughly mixed together in a vessel with a mixing propellor. Furthermore, 2½ kilograms of glycerine are added to the mix. It is advantageous to use for this purpose not pure glycerine, but glycerine such as accumulates from the processing of fats in the manufacture of soap. With a view to further mixing, the liquid is then transferred to another vessel by means of a turbo pump and is finally poured into barrels.

According to another typical embodiment the liquid mix comprises the following proportions:

| | Kg. |
|---|---|
| Sodium silicate | 26 to 40 |
| Potassium silicate | 26 to 60 |
| Water | 35 to 64 |
| Glycerine and caustic soda | 2 |
| Caustic soda | 0.055 |

The properties of both silicates are put to full account in this mix.

The sodium silicate in this compound causes the end products to be extremely hard and washable.

The potassium silicate acts in this case as a dispersion and fixing agent for the coloring pigments.

The water serves to hydrate the silicates and makes possible the following reaction:

$$Na_2SiO_3 + H_2O \rightleftharpoons SiO_2 + 2NaOH$$

whereby the silicon dioxide and caustic soda are liberated and can thus give effect to their hardening and stabilizing properties.

The glycerine and caustic soda, in the quantities stated, serve as stabilizers of the abovementioned reaction as the latter is reversible.

The powdery mix and the liquid mix are thus stored and transported to the place of use separately. Immediately before the rendering material is used, some 50 to 60 parts by weight of the powdery mix are stirred into a brushable paste with some 40 to 50 parts by weight of the liquid mix in a clean container; said paste is then applied to a wall or the like as a rendering. The paste can be applied in any known way, e.g. by hand with the aid of a brush or trowel, by means of a broom or it can be flung or sprayed on etc. with a machine. The consistency of the paste is varied to suit the mode of application by adding larger or smaller quantities of liquid mix to the powdery mix. The paste can also be made so thick that the surface of the rendering can be varied to give a relief effect. Finally, the rendering is allowed to set and dry. In the finished composition the following reactions then occur:

$$2NaOH + CO_2 \rightarrow Na_2CO_3 + H_2O$$
$$SiO_2 + CaCO_3 \rightarrow CaSiO_3 + CO_2$$

In the first reaction the caustic soda absorbs carbon dioxide on contact with the air and thus forms sodium carbonate and liberates water.

In the second reaction the silicon dioxide, which, like the caustic soda, has been liberated during the reaction by being mixed with the liquid bonding agent, reacts with the calcium carbonate which is contained in the mix of pigmenting earths, and thus forms potassium silicate, carbon dioxide being liberated.

The coloring of the coating compounds of these products is made possible by using potassium silicate in the composition of the liquid bonding agent, the outstanding properties of potassium silicate as a fixing and dispersion agent for the coloring pigments being enhanced and, as its reaction is similar to that of the sodium silicate, it performs a parallel function as a bonding and stabilizing agent for the compound.

The rendering described can be applied to wood, glass, iron, masonry, stone, cement and eternite, but not to gypsum, it being of course a prerequisite that the outside of the base should be clean and free from dust, rust, oil and grease. The rendering cannot be applied to varnish or oil paint.

On account of its relatively high content of quartz sand the rendering is extremely hard. It cannot be scratched, but it, on the other hand, is capable of scratching glass. The quartz sand and the asbestos give the rendering a very good heat insulating power. Furthermore, the rendering is resistant to heat up to about 1600° C., as well as resistant to inorganic acids and, largely, to organic acids. The rendering can be washed down with brush, soda or acid etc., and is approximately 94 percent impermeable to water. Greater impermeability to water would not be desirable because the walls underneath must as a rule still be able to "breathe," i.e. to absorb a certain amount of moisture and to give it off again.

The sodium silicate and the potassium silicate in the liquid mix cause a glass-like bonding of the powdery constituents, the glycerine slowing down the setting process and thus preventing the formation of cracks in the rendering. The constituents of the abovementioned bonding agent give the stirred paste the desired plasticity and also contribute to the hardness of the rendering after it has set. The barium sulphate and the titanium oxide, moreover, give the rendering a light color. The asbestos fiber particles likewise contribute to the plasticity of the stirred paste and also help, in particular, to prevent cracks in the rendering as they delay the setting process.

The rendering described can be used on buildings of any sort, both inside and outside.

The quantities of the individual constituents of the powdery mix and the liquid mix may of course deviate from the quantities given above only by way of example, in which case the properties of the rendering will be, to a certain extent, different. The resistance to acid, for instance, can be enhanced by increasing the proportion of quartz sand to as much as 90 parts by weight and the amount of sodium silicate and potassium silicate to as much as 60 parts by weight each.

Furthermore, it is, for instance possible to mix 2 parts by weight of the powdery mix first described, which contains quartz sand, powdered asbestos fiber and bonding agent, with another 3 parts by weight of the powdery bonding agent. The mix thus prepared will then contain, for instance, 70 kilograms of quartz sand, 4 kilograms of asbestos fibers and 182.5 kilograms of bonding agent, the composition of the latter being the same as in the first embodiment. This powdery mix is stirred with liquid mix of the kind described until a paste of such consistency is produced that it can be applied to a wall with the aid of a brush or roller. After it has set, the rendering will have a much finer, smoother surface than the rendering obtained according to the first embodiment. It is therefore particularly suitable for interior walls as a replacement for wallpaper, wall boards, tiles and so on, but it can also be used on outside walls. Depending on the consistency of the still paste-like rendering material, the surface can be given a relief effect or can be kept more or less smooth. The more thinly liquid the paste is made, the smoother the surface of the rendering.

The other properties of the rendering obtained in this way correspond to those according to the first embodiment with the limitation that the rendering is no longer resistant to acid. There is, however, the additional advantage that the rendering according to the second embodiment can also be applied to gypsum bases without the danger of it flaking off after it has hardened.

A comparison of the two embodiments described above shows that the quantities of the rendering's constituents can be varied between wide limits. In practice, perfect results are achieved if the powdery mix is made from some 60 to 90 parts by weight of quartz sand, some 3 to 6 parts by weight of asbestos fibers and 25 to 200 parts by weight of powdery bonding agent, it being possible for said bonding agent to have the composition mentioned in the foregoing.

Apart from the rendering of walls, the rendering can also be used to face the ceilings of rooms.

Having now particularly described and ascertained the nature of my said invention and in what manner the same is to be performed, I declare that what I claim is:

The method of forming a resistant protective covering on a surface, which comprises the steps of forming a dry powder mixture consisting of about 70 parts by weight of quartz sand together with 3 to 6 parts by weight of asbestos fibers and about 28 parts by weight of a bonding agent, said bonding agent comprising a mixture of about 25 parts by weight of calcium carbonate with about 25 parts by weight of barium oxide together with about 3 parts by weight of titanium oxide and with about 50 parts by weight of barium sulphate, separately forming a solution of from about 26 to 40 parts by weight of sodium silicate and about 26 to 60 parts by weight of potassium silicate together with about 2.5 parts by weight of glycerine in about 35 to 64 parts by weight of water, stirring about 50 to 60 weight parts of said dry powdered mixture into a paste with about 40 to 50 weight parts of said solution, immediately applying said paste to said surface, then allowing said paste-covered surface to stand, whereby said paste sets and dries.

References Cited in the file of this patent

UNITED STATES PATENTS

| | | |
|---|---|---|
| 1,067,542 | Pater | July 15, 1913 |
| 1,714,598 | Hardgrove | May 28, 1929 |
| 2,238,472 | Koerner et al. | Apr. 15, 1941 |
| 2,434,466 | Marc | Jan. 13, 1948 |

FOREIGN PATENTS

| | | |
|---|---|---|
| 340,868 | Great Britain | Jan. 9, 1931 |
| 482,308 | Great Britain | Mar. 28, 1938 |